United States Patent
Kim

(10) Patent No.: US 9,110,848 B1
(45) Date of Patent: Aug. 18, 2015

(54) BACKUP-INSTRUCTING BROADCAST TO NETWORK DEVICES RESPONSIVE TO DETECTION OF FAILURE RISK

(71) Applicant: Belkin International, Inc., Playa Vista, CA (US)

(72) Inventor: Ryan Yong Kim, Rolling Hills Estates, CA (US)

(73) Assignee: Belkin International, Inc., Playa Vista, CA (US)

( * ) Notice: Subject to any disclaimer, the term of this patent is extended or adjusted under 35 U.S.C. 154(b) by 0 days.

(21) Appl. No.: 14/508,000

(22) Filed: Oct. 7, 2014

(51) Int. Cl.
*G06F 11/00* (2006.01)
*G06F 11/14* (2006.01)
*G06F 11/07* (2006.01)

(52) U.S. Cl.
CPC ........ *G06F 11/1461* (2013.01); *G06F 11/0754* (2013.01); *G06F 2201/805* (2013.01); *G06F 2201/81* (2013.01); *G06F 2201/84* (2013.01)

(58) Field of Classification Search
CPC .................................................. G06F 11/1458
See application file for complete search history.

(56) References Cited

U.S. PATENT DOCUMENTS

| | | | |
|---|---|---|---|
| 8,155,766 B2 * | 4/2012 | Ichikawa et al. | 700/82 |
| 8,266,398 B2 * | 9/2012 | Manczak et al. | 711/162 |
| 2004/0078655 A1 * | 4/2004 | Sung | 714/14 |
| 2009/0292887 A1 * | 11/2009 | Manczak et al. | 711/162 |
| 2010/0323657 A1 * | 12/2010 | Barnard et al. | 455/404.1 |
| 2011/0066765 A1 * | 3/2011 | Mochizuki | 710/14 |
| 2012/0246417 A1 * | 9/2012 | Kaji et al. | 711/154 |
| 2013/0019076 A1 * | 1/2013 | Amidi et al. | 711/162 |
| 2013/0142001 A1 * | 6/2013 | Sweere et al. | 365/229 |
| 2013/0179715 A1 * | 7/2013 | Sun et al. | 713/323 |
| 2013/0252712 A1 * | 9/2013 | Wells et al. | 463/24 |
| 2014/0181012 A1 * | 6/2014 | Min et al. | 707/610 |
| 2014/0189234 A1 * | 7/2014 | Tang et al. | 711/113 |
| 2014/0281153 A1 * | 9/2014 | Mehrotra et al. | 711/103 |

* cited by examiner

*Primary Examiner* — Christopher McCarthy
(74) *Attorney, Agent, or Firm* — Kilpatrick Townsend & Stockton LLP

(57) ABSTRACT

Embodiments relate to systems and methods for detecting failure-risk events at devices and facilitating local and/or remote data back-up and/or device operations. In some instances, a device characterizes a stimulus sensed at the device or an operation of a component of the device. A determination is made that a failure-risk condition is satisfied based on the characterization. In response to determining that the failure-risk condition is satisfied, the device initiates a data backing up of data in a non-volatile reserved memory or facilitates transmission of an alert communication from the device to another device.

22 Claims, 17 Drawing Sheets and are not intended to limit the scope of the claims appended to this specification.

BACKUP-INSTRUCTING BROADCAST TO NETWORK DEVICES RESPONSIVE TO DETECTION OF FAILURE RISK

FIELD OF INVENTION

This disclosure relates in general to a network device that, in response to detecting that a failure-risk condition is satisfied, backs up local data and sends a communication to cause another network device to back up its data as well.

BACKGROUND

A variety of events can damage electronic devices. Exemplary events include a fire, blackout, brownout, flood, extreme temperatures and device malfunctioning. Traditionally, such events would result in a loss of the device or part of its functioning. Recently, electronic devices have become "smarter". They can store data specific to a user or setting, and they can track historical data relating to the device usage or to sensor readings. A destructive event can limit or prevent access to such data.

SUMMARY

In some embodiments, a network device accesses a failure-risk condition (e.g., defining a threshold power spike, a threshold temperature or a device component operation) and monitors for conditions that satisfy the condition. Upon detecting that the condition is satisfied, the network device commits data (e.g., settings and/or sensor readings) to memory. In some instances, this backup is performed using a reserve power source, such as a local battery. In some instances, the data is stored at least partly on a reserved storage, such as a flash memory.

Satisfaction of the failure-risk condition can also cause the network device to transmit a communication to one or more other devices. For example, a communication can be concurrently or sequentially sent to one or more other network devices (e.g., all network devices on a network, of one or more specific types, at a particular location and/or with above-threshold priorities). The communication may cause the other network device(s) to also backup their data (e.g., locally or by sending communications to a remote device) and/or to change their settings (e.g., to power off). As another example, a communication can be sent to an access device to alert a user of the condition satisfaction.

Such triggered and coordinated backup processes provide a variety of advantages. User data can be preserved, such that it need not be re-entered or re-learned upon a replacement or repair of the device. Further, sensor data and/or settings can be used to identify what particular circumstances led to device failure or damage. Further yet, cross-device communication can reduce device damage responsive to an event (e.g., by causing a device to turn off before being effected by a power spike), increase a quantity of data that can be stored (e.g., by providing additional time for backup) and/or allow a user to quickly respond to an event.

In some embodiments, a device is provided that includes a non-volatile reserve memory, a detector configured to characterize a physical stimulus or an operation of a component of the device, and one or more data processors. The device also includes a non-transitory computer readable storage medium containing instructions which, when executed on the one or more data processors, cause the one or more data processors to perform actions including determining that a failure-risk condition is satisfied, wherein the determination is made based on the characterization of the physical stimulus or operation of the component of the device; and in response to determining that the failure-risk condition is satisfied, backing up data in the non-volatile reserved memory.

In some embodiments, a computer-implemented method is provided. A characterization is made of a stimulus sensed at a device or an operation of a component of the device. A determination is made that a failure-risk condition is satisfied based on the characterization of the stimulus or the operation of the component of the device. Data is backed up at the device in a non-volatile reserve memory in response to the determining that the failure-risk condition is satisfied.

In some embodiments, a device is provided a detector configured to characterize a physical stimulus or an operation of a component of the device and one or more data processors. The device also includes a non-transitory computer readable storage medium containing instructions which, when executed on the one or more data processors, cause the one or more data processors to perform actions including determining that a failure-risk condition is satisfied based on the characterization of the physical stimulus or operation of the component of the device; and in response to determining that the failure-risk condition is satisfied, facilitating transmission of an alert communication to another device. The device and the other device can be part of a same local area network. The alert communication can correspond to an indication that the failure-risk condition is satisfied.

In some embodiments, a computer-implemented method is provided. A characterization is made of a stimulus sensed at a device or an operation of a component of the device. It is determined that a failure-risk condition is satisfied based on the characterization of the stimulus or the operation of the component of the device. In response to determining that the failure-risk condition is satisfied, transmission of an alert communication from the device to another device is facilitated. The device and the other device can be part of a same local area network. The alert communication can correspond to an indication that the failure-risk condition is satisfied.

In some embodiments, a computer-program product tangibly embodied in a non-transitory machine-readable storage medium, including instructions configured to cause one or more data processors to perform part or all of method disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Illustrative embodiments of the present invention are described in detail below with reference to the following drawing figures.

DETAILED DESCRIPTION

Figure 1:
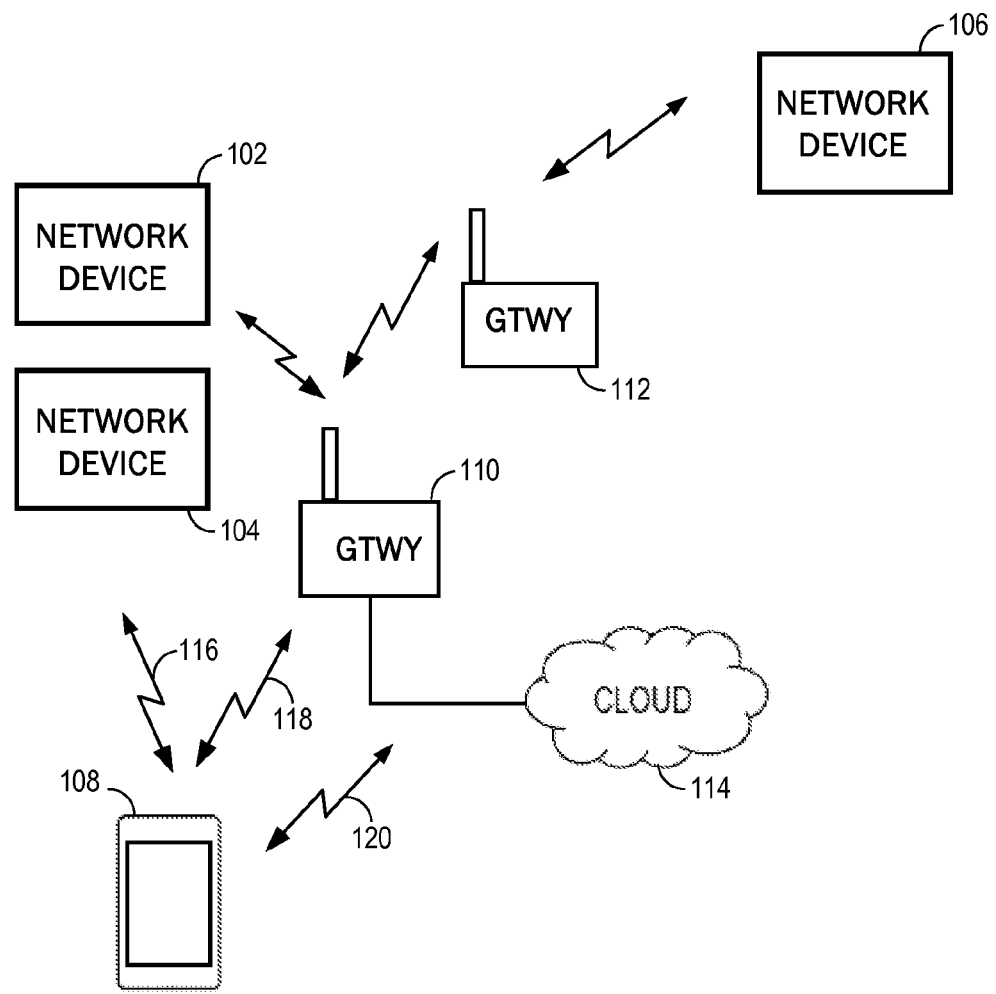
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

In some instances, a primary gateway can be identified and a logical network can be generated using credentials of the primary gateway. Accordingly, a single logical network may be generated for a local area network. Whether located locally or remotely, a user may thus access all network devices in the local area network using the single logical network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
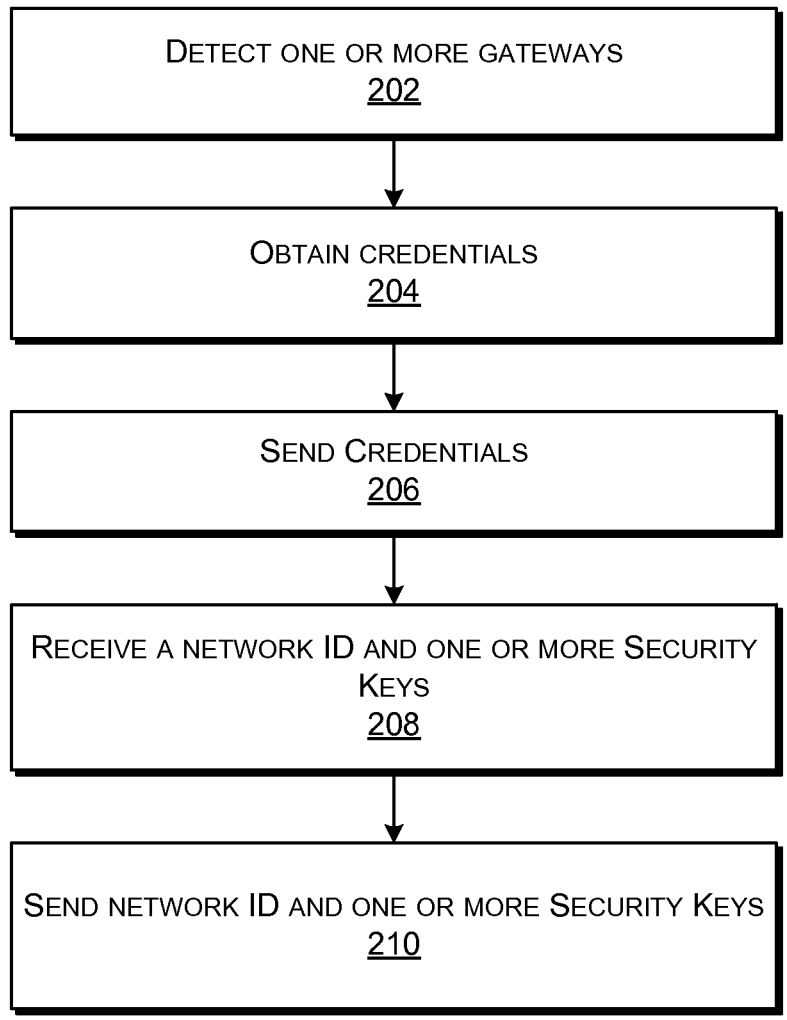
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house.

Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":" Signature":" ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":" Signature":" ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64 (HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 3:
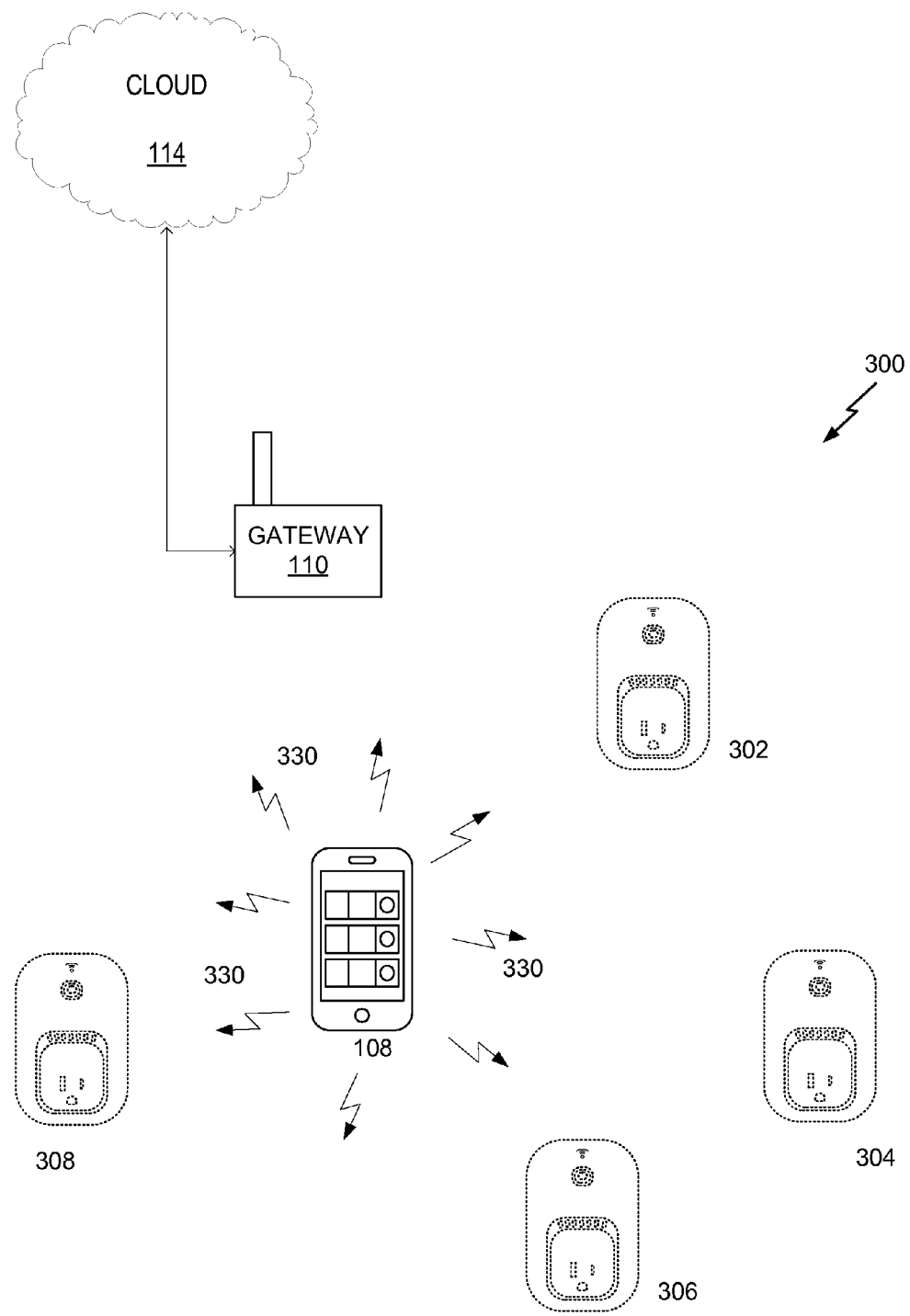
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
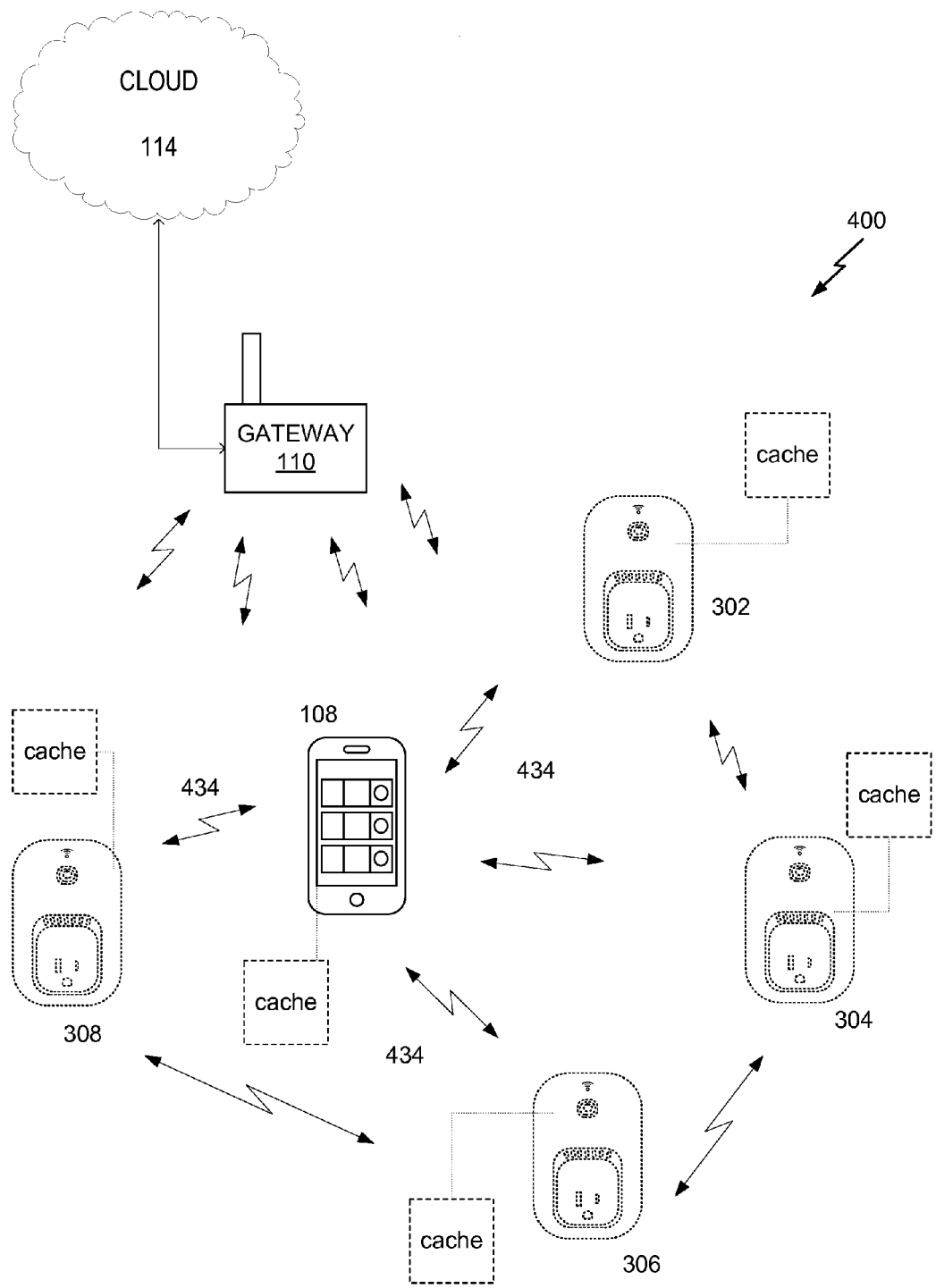
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
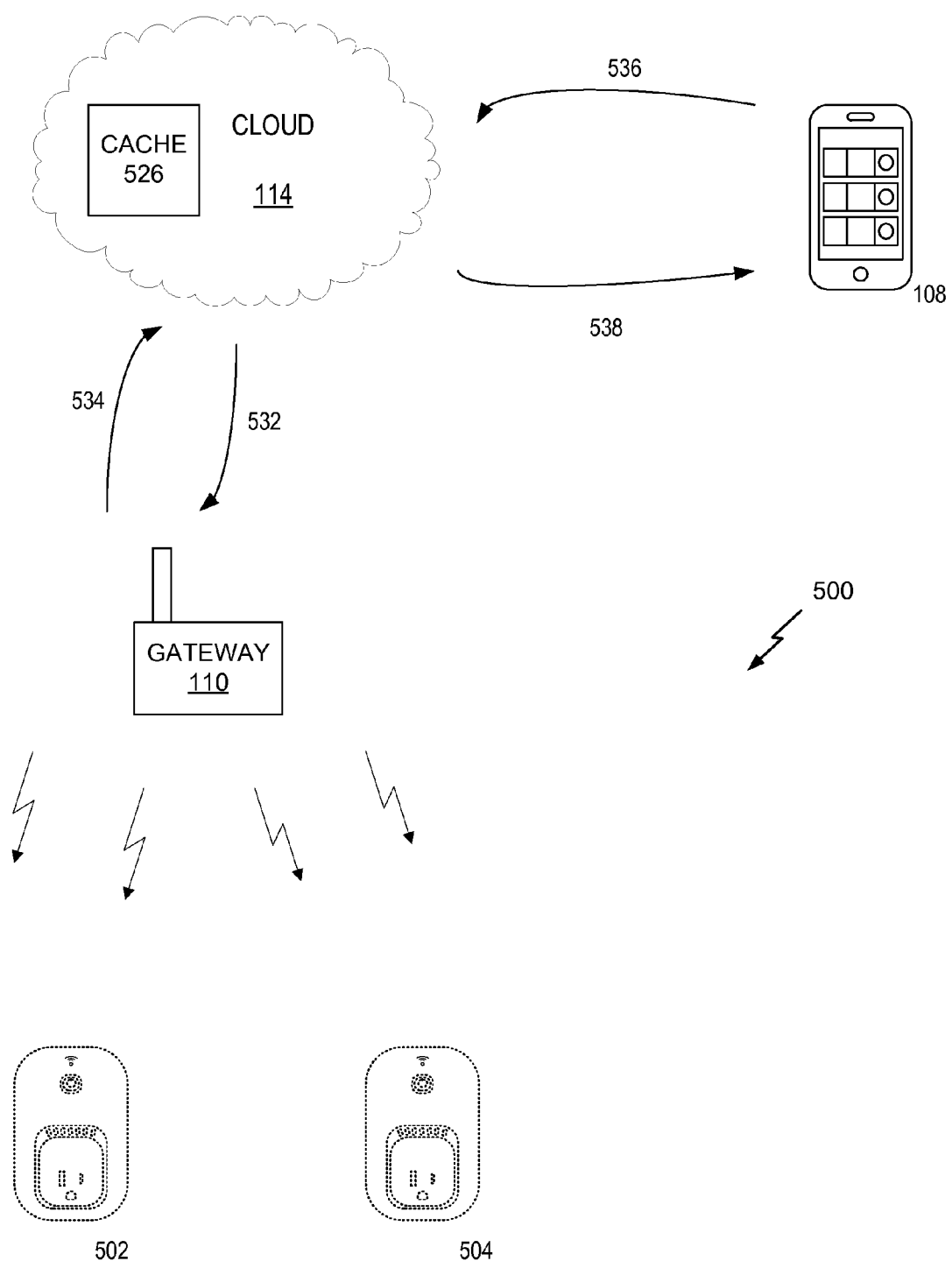
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
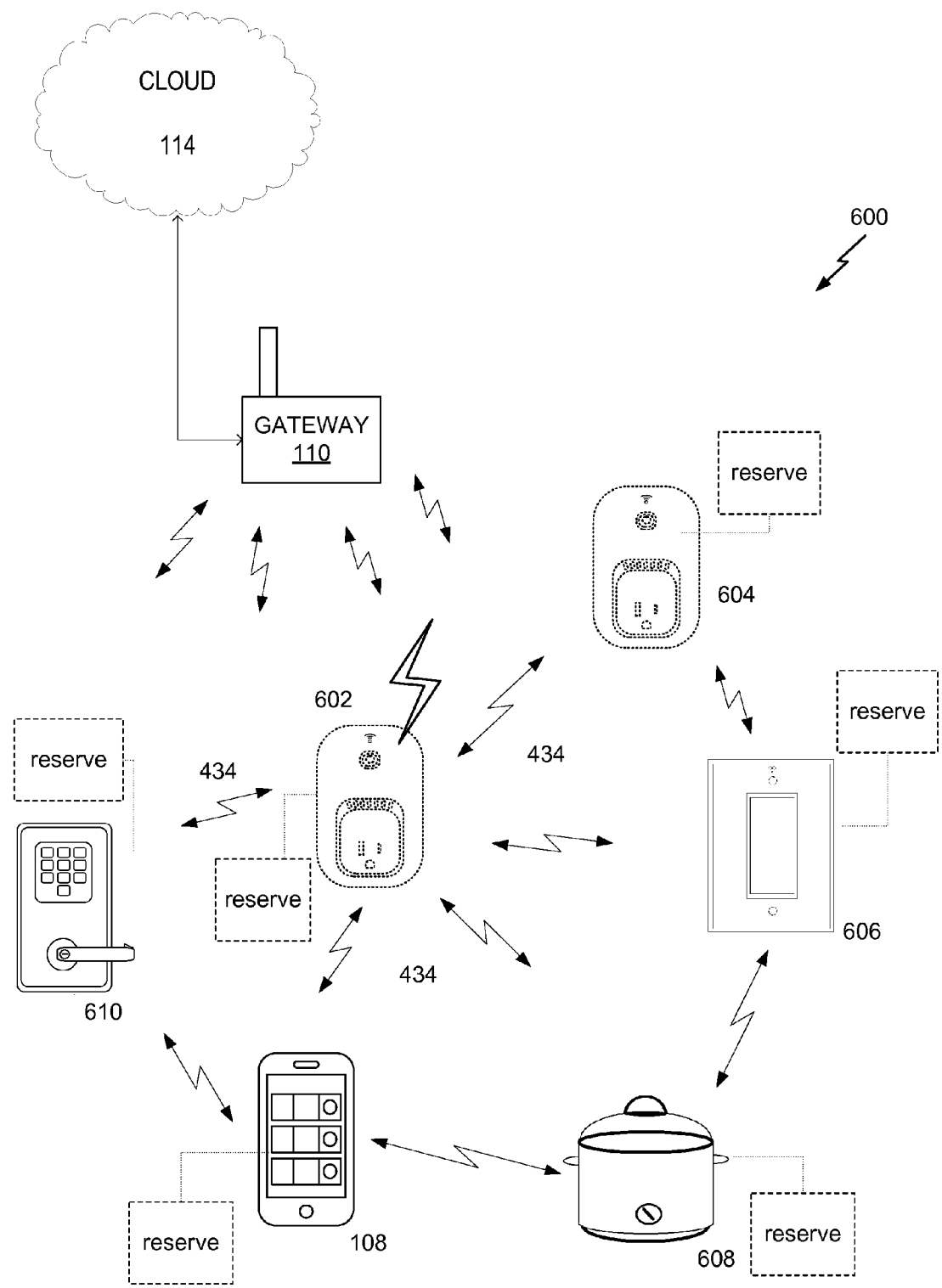
FIG. 6 illustrates an example of a network, according to embodiments of the present invention.

FIG. 6 illustrates an example of a network 600, according to embodiments of the present invention. Specifically, the network 600 can be a wireless local area network enabling a network device to communicate with one or more other network devices and/or access device to convey a detection of a potential or actual device failure. Network 600 includes network devices 602, 604, 606, 608 and 610. It will be appreciated that, while FIG. 6 depicts select particular network devices (smart outlets, a light switch, a crockpot and a door lock), different embodiments can be extended to apply to various other devices (e.g., inclusive of additional device types not shown in FIG. 6 and/or excluding one or more device types shown in FIG. 6). The network 300 also includes access device 108.

The network device 602 can detect a stimulus or operation characteristic corresponding to a potential or actual device failure or damage (e.g., as set forth in a failure-risk condition). In the depicted illustration, the network device 602 detects a power spike occurring as a result of a thunderstorm. It will be appreciated that a variety of other detections and/or underlying events may be indicative of potential or actual device failure or damage. For example, the network device 602 may detect a high temperature (e.g., corresponding to a fire, warm conditions or device malfunction), water (e.g., corresponding to a flood or a water spill), high humidity (e.g., corresponding to a flood), or non-responsiveness of a component of the device (e.g., corresponding to a malfunction of the device).

In response to the detection, the network device 602 can commit device data to a memory. The device can include another (e.g., volatile) memory that is used in other circumstances (e.g., to store current and/or historical device settings, sensor data, local statuses, statuses of other devices, etc. when the condition is not satisfied). The memory can include one for which writing capability and/or speed is limited and/or deteriorates across repeated usages. The memory can include a local memory present in the device and/or a non-volatile memory (e.g., a flash memory, programmable read-only memory, erasable programmable read-only memory, electrically erasable programmable read-only memory, ferroelectric random access memory, non-volatile random access memory, bubble memory or magnetoresistive random access memory), and/or a low-power memory for which less power is required to write data to the memory than required for traditional RAM writing. The memory can be a reserve memory such that it is not routinely used to store data. For example, in some instances, data is written to the memory only when a failure-risk condition is satisfied.

The device data can include, for example, data reflecting usage of the device. Data may correspond to user input received at or controlling operation of the device, one or more current device settings or operations (e.g., a power state and/or intensity), learned settings or patterns, readings of sensors at or associated with the device (or processed versions thereof), and/or performance indicators of the device or of one or more components of the device. For example, data may include an operation rule defined based on user input that identify a condition (e.g., a time of day, motion detection or switch configuration) and a device operation (e.g., a power state or setting). As another example, data may include a set of recent or current readings from one or more sensors (e.g., reflecting an environmental temperature and humidity). Data may correspond to a present time (e.g., reflecting a current device state) and/or to a past time or time period (e.g., reflecting an average sensor reading over a particular time period).

Additionally or alternatively in response to the detection, the network device 602 can transmit an alert communication to one or more of the other network devices 604, 606, 608 and/or 610. The alert communication can correspond to an indication that the network device 602 has detected a stimulus or operation characteristic corresponding to a potential or actual device failure or damage. In some instances, the alert communication can cause or corresponds to an instruction to another network device to ensure that a setting of the device is appropriately set (e.g., to power off or in a secure state) and/or to backup its data (e.g., locally or by transmitting it to another network device, the gateway 110 and/or the cloud 114). Such action can provide the other network device with a lead time and/or increased device capabilities to perform the backup before an effect of an event such as a blackout, brownout, fire or flood also affects the other device.

The network device 602 can also or alternatively transmit a same or different alert communication to the access device. The alert communication can cause or corresponds to an instruction to the access device 108 to present an indication corresponding to the detection, such that a user can be alerted (e.g., of a potential or actual device malfunction or undesirable stimulus).

Data backup and/or transmissions can be performed using a power reserve, such as a battery in the network device 602. Thus, even if the device is damaged or isolated to a point of no longer receiving AC power and/or no longer having capabilities to write to a default memory, the device can nonetheless preserve select data.

An alert communication may include and/or correspond to, for example, an identifier of the transmitting device, an indication that a failure-risk condition has been satisfied, an identification of which failure-risk condition was satisfied, an identification of a current state of network device 602, an identification of a current location of network device 602, a sensor reading (or processed version thereof), a device performance metric, an instruction to backup data, an instruction to change a setting or status, an instruction to change or remove a dependency on the transmitting device, an instruction to present an alert and/or an instruction to change a status identifier stored at the receiving device corresponding to the transmitting device. Thus, in response to receiving an alert communication, a receiving device may (for example) begin backing up data, change a setting or status, change or remove a dependency on the transmitting device, present an alert and/or change a status identifier stored at the receiving device corresponding to the transmitting device.

In some instances, a single event may first cause a first device to begin failing and may subsequently cause a second device to start failing. Transmission of an alert communication from the first device to the second device can provide the second device with extra time and/or device capabilities (e.g., power) to perform failure-responsive tasks. It can further or alternatively allow the second device to change its status (e.g., to power off) to reduce a probability or extent of damage to the device and/or caused by the device. It can further or alternatively allow a user to be notified of the event, such that he/she can quickly respond (e.g., by extinguishing a fire, turning off a water source, calling emergency personnel, etc.).

In some instances, a second device may detect the failure of a first device. For example, a second device in a "connected" cluster of smoke detector can detect that a first device in the cluster (e.g., a nearby first device) has failed due to power loss. The power loss may have occurred, for example, due to a localized power outage or drain of a battery in the first device). In such a case, the second smoke detector may send an alert communication (e.g., including one or more characteristics of the first device, such as an identifier or location) to another device, such as a gateway device 100, cloud device 114, other network device or access device 108.

In some instances, a first device can be configured to draw power from each of a plurality of power sources (e.g., an AC power source and a local battery, such as a 9V battery). A first power source (e.g., an AC power source) can be configured to provide sufficient power to allow the first device to communicate over a first communication channel (e.g., a WiFi communication channel). However, if a situation arises where the first power source is not available to the first device, it must use the second power source. The power source can include one configured to provide sufficient power, for example, for full or partial data backup (remote and/or local backup, depending on the embodiment) and/or to communicate (e.g., an alert communication) via a second communication channel (e.g., a short-range communication channel).

Transmissions may include using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. In some instances, transmissions use a low-energy protocol such that a power reserve can be conserved.

When a device is transmitting one or more communications to multiple target devices, the device may or may not use the same communication protocol for each of the target devices. For example, for each of a set of target devices, a device may transmit a communication to the target device using what is estimated to be the lowest-energy communication protocol that will support successful transmission.

In some instances, one or more communications are transmitted to multiple target devices simultaneously or concurrently (e.g., via a broadcast transmission or multiple individual transmissions). In some instances, a device transmits one or more communications to one or more target devices sequentially. For example, a device may successively send communications to a target device using increasingly higher-energy transmission protocols until the target device sends a receipt acknowledgement communication. As another example, a device may first send a communication to a target device physically near the device, subscribed to the transmitting device or having a rule that depends on a status of the device, and the device can later send a communication to a target device further from the device or without the rule. The device can order transmissions according to a priority ranking (e.g., ranking devices based on device type, proximity, user-identified priority, rule dependencies, etc.). Thus, if a battery reserve dies before all transmission are sent, transmissions of highest priority are hopefully already sent.

Similarly, backups may occur in an ordered manner. For example, what data is being backed up may be ordered. Data of particular types (e.g., sensor readings, settings or rules) may be prioritized over other data types, or recent data may be prioritized over older data. As another example, where data is being backed up may be ordered (e.g., first backing up some or all of a data set on a non-volatile memory, second backing up the same or different data in a volatile memory and then transmitting the same or different data to a cloud server or other device).

Figure 7:
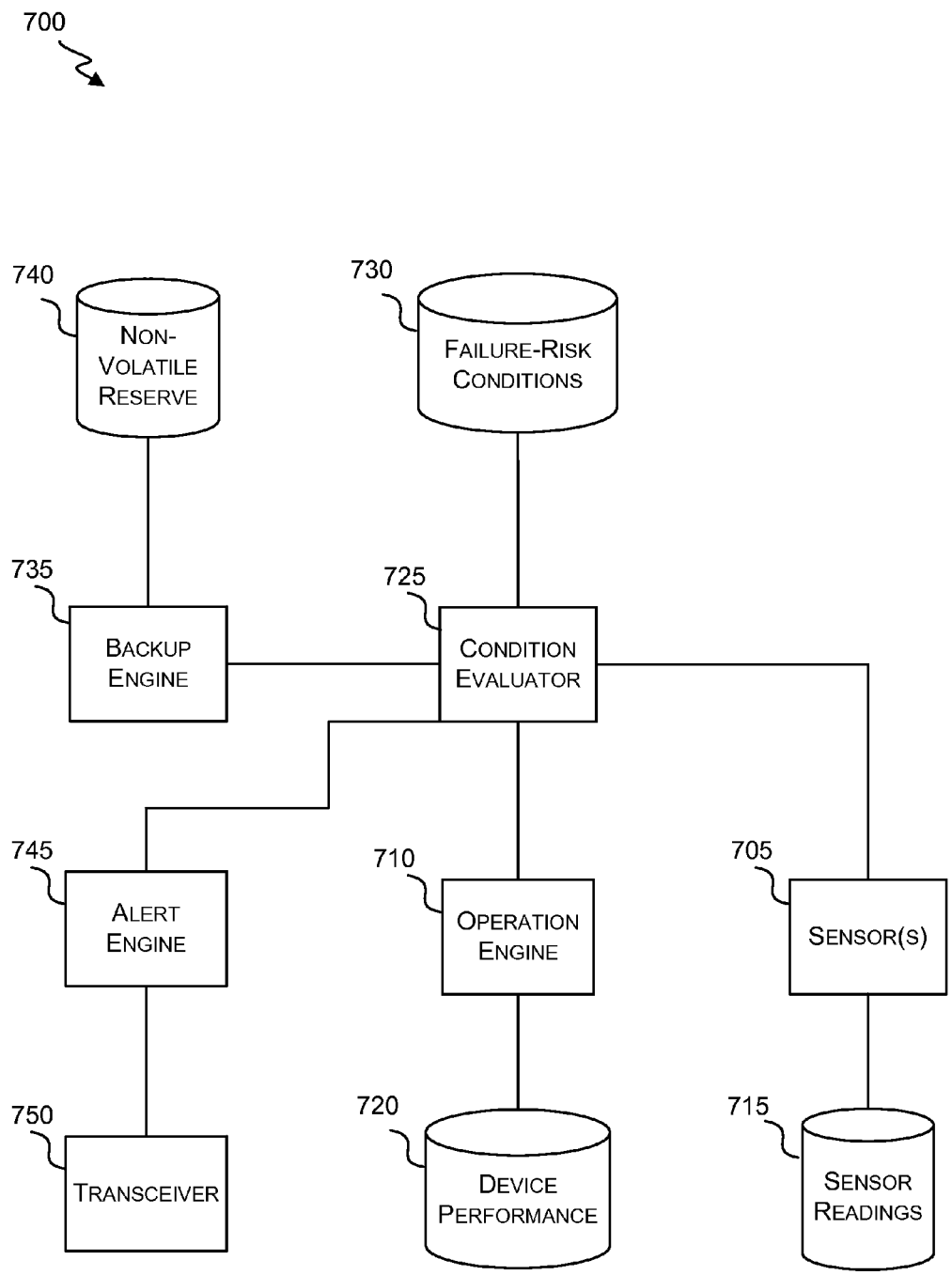
FIG. 7 shows a block diagram of a network device according to an embodiment of the invention.

FIG. 7 shows a block diagram of a network device 700 according to an embodiment of the invention. Device 700 can include one or more detectors for detecting conditions pertaining to the device. The one or more detectors can include a sensor 705 and/or an operation engine 710. The sensor 705 can include one configured to monitor a physical stimulus external to, internal to or being experienced by the device. For example, the sensor 705 may be configured to monitor temperature, humidity, water or moisture, light, sound, acceleration and/or rotation. The sensor 705 may generate a sensor reading based on the monitoring that can be stored in a sensor reading data store 715. The sensor reading can include a magnitude (e.g., a temperature in ° C. or a percent humidity), a direction and/or a threshold comparison (e.g., whether an acceleration value exceeded a threshold).

The operation engine 710 can monitor an operation of a device or device component. For example, the operation engine 710 can generate a device performance metric that can be stored in a device performance data store 720. The device performance metric can include, for example, a value of a supplied voltage or current, an indication as to whether a device component (e.g., a CPU) is performing any task, an identification as to which task(s) a device component is performing, an indication as to whether a device component is responsive, and/or an indication as to whether or an extent to which a task (e.g., a write and/or read task) is being properly performed.

The detected variable(s) (e.g., sensor readings and/or device performance metrics) can be made available to a condition evaluator 725. The condition evaluator 725 can access one or more failure-risk conditions from a failure-risk condition data store 730. Failure-risk conditions may be fixed, learned or defined by a user. A failure-risk condition can include one or more thresholds for a variable or processed version thereof (e.g., a threshold for a change or acceleration in provided voltage). Each condition can be associated with an action that is to be performed upon satisfaction of the condition. The action can include, for example, backing up data, changing a status or setting of the device and/or transmitting a communication to another device.

All of part of one or more failure-risk conditions and/or corresponding actions to perform may or may not vary across devices, device types, networks and/or time periods. For example, each of a first device and a second device may be associated with a condition of an above-threshold noise (e.g., corresponding to an alarm), but the first device may respond to satisfaction of the condition by backing up its data, whereas the second device may respond by changing to a "locked" state or status and sending an alert communication to an access device.

The condition evaluator 725 can use the detected variable(s) to determine whether and/or which failure-risk conditions are satisfied. For example, the condition evaluator 725 may determine (in accordance with a condition) whether an external temperature has exceeded a temperature threshold, whether a device acceleration has exceed an acceleration threshold, whether a CPU has become unoperational, whether a change in voltage exceeded a threshold, and/or whether moisture has been detected.

When the condition evaluator 725 determines that a condition is satisfied, one or more actions associated with the condition can be triggered. In one instance, the action includes backing up device data. Backing up data can include, for example, copying data from one data store onto another data store, transmitting data from one data to another data store or collecting data (e.g., instantaneous sensor readings) and storing the data on a data store.

A backup engine 735 can identify which data is to be backed up and/or where it is to be backed up to (e.g., each of which can be identified in association with the satisfied condition and/or action to be performed). In some instances, data is to be stored on a local reserve memory, such as a non-volatile reserve memory 740 (e.g., a flash memory). The stored data can include recently detected data (e.g., sensor readings or performance metrics), recent or current device settings or states, stored rules for the device or usage patterns, etc.

Satisfaction of the condition may also or alternatively trigger transmission of an alert communication. An alert engine 745 can generate the communication. Generating the communication may include identifying one or more variables or other content to include in the communication, such as a sensor reading, device performance metric or instruction for a receiving device. The alert communication can include information about the device 700 (e.g., a device identifier or identifier of a type of the device), one or more networks (e.g., a local area network identifier or another network identifier) and/or a time.

For a given alert communication, the alert engine 745 can identify one or more target devices to which to transmit the communication to. This identification can include identifying a one or more devices having one or more characteristics (e.g., being associated with a particular network, having a particular or above-threshold priority, being located within a given proximity or area, and/or being of one or more device types) and/or identifying a defined target-device list of one or more devices. The identification may also include ordering identified devices, such that an alert communication can be sent to one or more low-order devices before an alert communication is sent to one or more higher-order devices.

The alert engine 745 can also identify a transmission protocol by which to send an alert communication. In some instances, different alert communications are sent using different protocols and/or alert communications sent to different devices or device sets are sent using different protocols. In some instances, a transmission protocol selection may depend on whether a previous transmission was successful (e.g., whether a receipt acknowledgement was received), a progress of a data backup effort and/or a portion of a power reserve left available. A selection of a transmission protocol may depend on a characteristic of a target device (e.g., a priority, location and/or status).

A transceiver 750 can then transmit the generated alert communication to an identified target device using an identified transmission protocol. The transmission may include a wireless transmission. The transceiver 750 may also, in some instances, be configured to detect an acknowledgement communication, which may be conveyed to the alert engine 745 (e.g., such that it can avoid attempting re-transmission or influence transmission-protocol selections). It will be appreciated that, though FIG. 7 depicts the device 700 as including a single transceiver component 750, the component may include a separate transmitter and receiver or a combination thereof.

Satisfaction of the condition may also or alternatively trigger a change in a setting or state of the device 700. The operation engine 710 may, for example, change a setting or state to a power-off state, a secure state (e.g., to lock a security device) or an alarm state (e.g., to sound an alarm), a low-power state (e.g., to reduce energy consumption). Satisfaction of the condition may also or alternatively trigger a change in a rule of the device 700. For example, the operation engine 710 may modify or suppress rules such that the device 700 is to operate independently of one, more or all other network devices or to avoid scheduled state changes.

In some instances, the condition evaluator 725 determines that a failure-risk condition has been satisfied based on a communication received (via the transceiver 750) at the device. The received communication can be an alert communication from another device. The alert condition may itself be sufficient to satisfy the condition or may be sufficient only along with other circumstances. For example, a first condition may identify a heat threshold applicable when no alert communication has been received, and a second condition may identify a lower heat threshold applicable when an alert communication has been received. In this case, satisfaction of the second condition would require receipt of an alert communication and a sensor reading above the lower threshold. As another example, a condition may require receipt of multiple alert communications.

When a condition is satisfied, the device may be triggered to backup data, send an alert communication to one or more other devices and/or change its operation (e.g., to change a setting or state or to change an operation rule).

Figure 8:
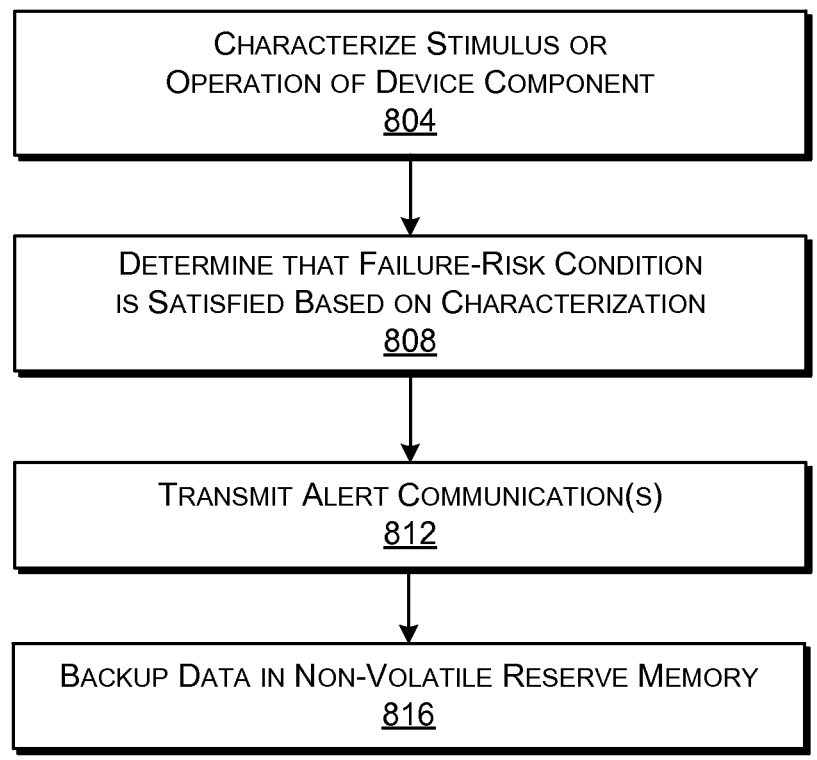
FIG. 8 illustrates an example of a process for triggering failure-risk actions according to an embodiment of the invention.

FIG. 8 illustrates an example of a process 800 for triggering failure-risk actions according to an embodiment of the invention. Process 800 can be performed in part or in its entirety at a network device.

Process 800 begins at block 804 where one or more detectors characterize a stimulus or operation of a component of a device (e.g., a device performing process 800). The characterization can include, for example, identifying a sensor reading or device performance metric, detecting a stimulus surrounding the device or inside the device, quantifying the stimulus, converting a stimulus to an electronic representation, assessing a task performance or responsiveness of a device component, or identifying a CPU or memory consumption.

At block 808, the condition evaluator 725 determines that a failure-risk condition is satisfied based on the characterization. The determination can include processing the characterization. For example, block 808 can include comparing a stimulus reading or device performance metric to a threshold; identifying a change, slope or acceleration of a stimulus reading or device performance metric, averaging multiple stimulus readings or device performance metrics, etc. Block 808 can also include identifying which failure-risk condition is satisfied and/or which responsive actions are associated with the satisfied condition. In some exemplary instances, block 808 corresponds to detecting a power spike, detecting that power supplied by a particular power source (e.g., an AC power source) has been lost or fallen below a threshold, detecting failure of a device component, detecting liquid, detecting a high temperature or detecting a lack of power.

At block 812, the transceiver 750 can transmit an alert communication to one or more target devices, which can include a network device, an access device or a set of network devices and/or access devices. In some instances, the alert communication can be transmitted to a destination device (e.g., a mobile access device) that is associated with a same local area network as is the transmitting device. The destination device can be associated with the same local area network in a manner such that it can receive notifications pertaining to and/or control operations of network devices in the local area network. It will be appreciated, however, that the association need not be one that indicates that the destination device is connected directly to the local area network. Rather, for example, an alert communication can be transmitted to a gateway device or remote device (e.g., a server in the Internet cloud) that can bridge the local area network with a remote network.

In some instances, the alert communication is transmitted using a backup power source (e.g., a local battery as opposed to an AC power source) and/or via a secondary communication channel (e.g., over a short-range network). For example, if the determination at block 808 indicates that power supplied from a first power source (e.g., an AC power source) has been lost, has decreased, is below a threshold or is unstable, the alert communication may be transmitted using power from the backup power source and/or the alert communication may be transmitted using a communication channel requiring less power than a primary communication channel (e.g., a BTLE channel as opposed to a WiFi channel).

The alert communication can include one generated by the alert engine 750. The alert communication can be transmitted using a transmission protocol as identified by the alert engine 750. Generation of the alert communication and/or transmission of the alert communication may be performed using a reserved power source (e.g., a local battery).

At block 816, the backup engine 735 backs up data pertaining to the device in a non-volatile reserve memory 740 of the device. The data can include, for example, data detected at the device, data corresponding to user input, data corresponding to operation rules, learned data, and/or data based on usage of the device.

Figure 9:
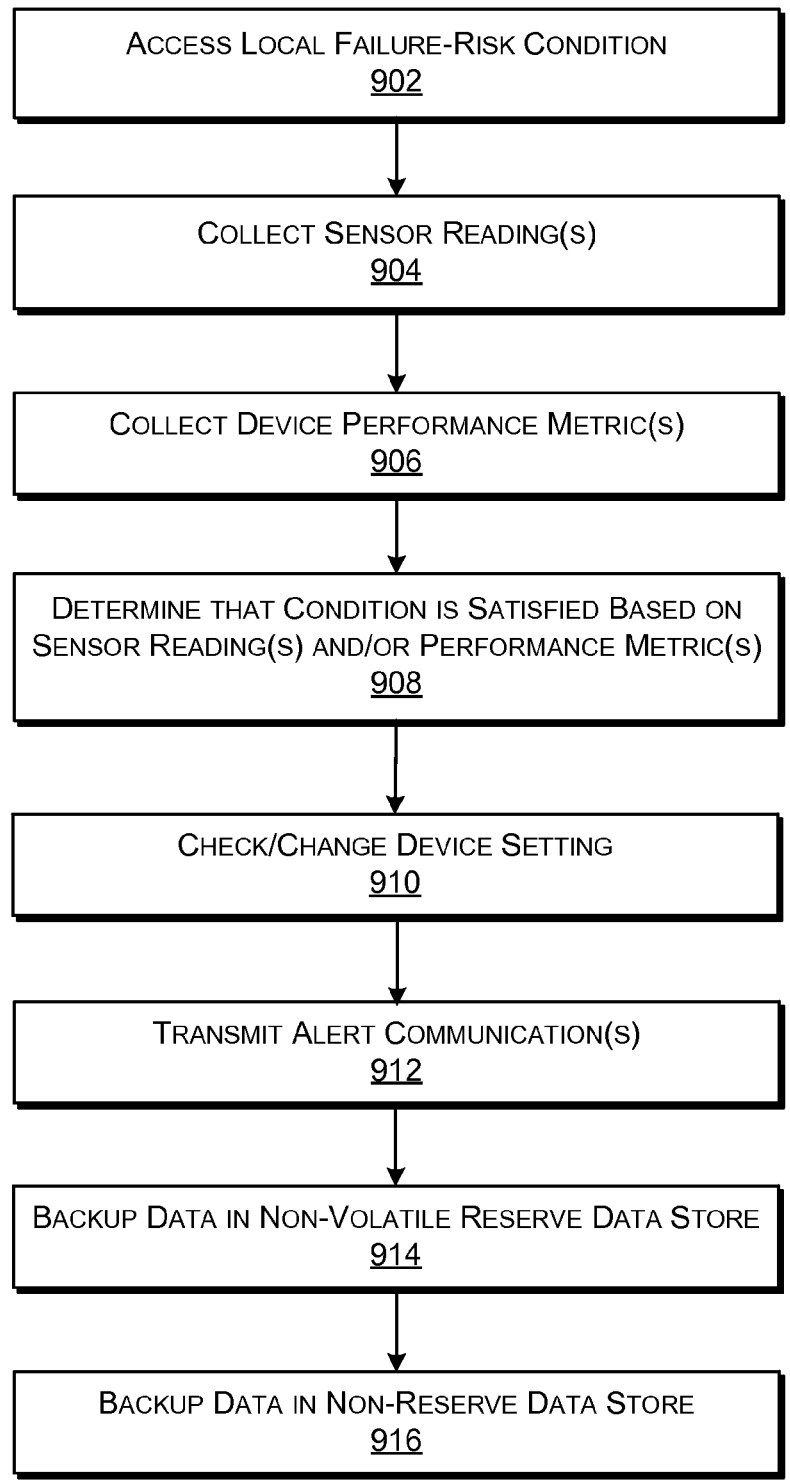
FIG. 9 illustrates an example of a process for triggering failure-risk actions according to an embodiment of the invention.

FIG. 9 illustrates an example of a process 900 for triggering failure-risk actions according to an embodiment of the invention. Process 900 can be performed in part or in its entirety at a network device.

Process 900 begins a block 902 where a failure-risk condition stored at the device is accessed by condition engine 730. The failure-risk condition can depend on a characteristic of the device, such as a type of the device, a location of the device, a priority of the device (e.g., based on user input), and/or a network. The failure-risk condition may depend on a user input.

One or more sensors 705 collect one or more sensor readings at block 904. The sensor reading(s) can quantify a characteristic (e.g., presence, intensity, type (e.g., color) and/or direction) of a stimulus surrounding or inside the device. The stimulus can, for example, include a physical stimulus, can include one that can be quantified by a sensor and/or can be one pertaining to a temperature, humidity, water or moisture, light, sound, acceleration and/or rotation stimulus.

The operation engine 710 collects one or more device performance metrics at block 906. The device performance metrics can reflect a performance of a device or component of the device. Blocks 904 and/or 906 can be performed continuously during device operation, at defined times or time intervals, or upon certain detections (e.g., communication receipts).

Blocks 908, 912 and 914 can parallel blocks 808, 812 and 814 of process 800. At block 910, the operation engine 710 checks and/or changes a device setting. Changing a device setting can include, for example, changing its state, changing an intensity, and/or changing an interaction setting (e.g., to change what devices it is communicating statuses to and/or pulling communications from).

Process 900 includes block 916, where data is also backed up in a non-reserve data store. Block 916 exemplifies that data can be backed up in a successive and/or concurrent manner. For example, data can first be backed up onto a non-volatile reserve data store to reduce energy usage and to allow for quick backup. If the device is still operating and/or has remaining power available, it can continue backing up data in other ways (e.g., onto a non-reserve local or remote data store).

It will be appreciated that process 900, like all disclosed processes, is illustrative. In some embodiments, a process can be modified to include one or more additional blocks, one or more fewer blocks and/or one or more different blocks as compared to those included in depicted embodiments. Additionally or alternatively, blocks can be reordered. For example, in an embodiment of process 900, block 914 may be performed before block 910 and/or block 912.

Figure 10:
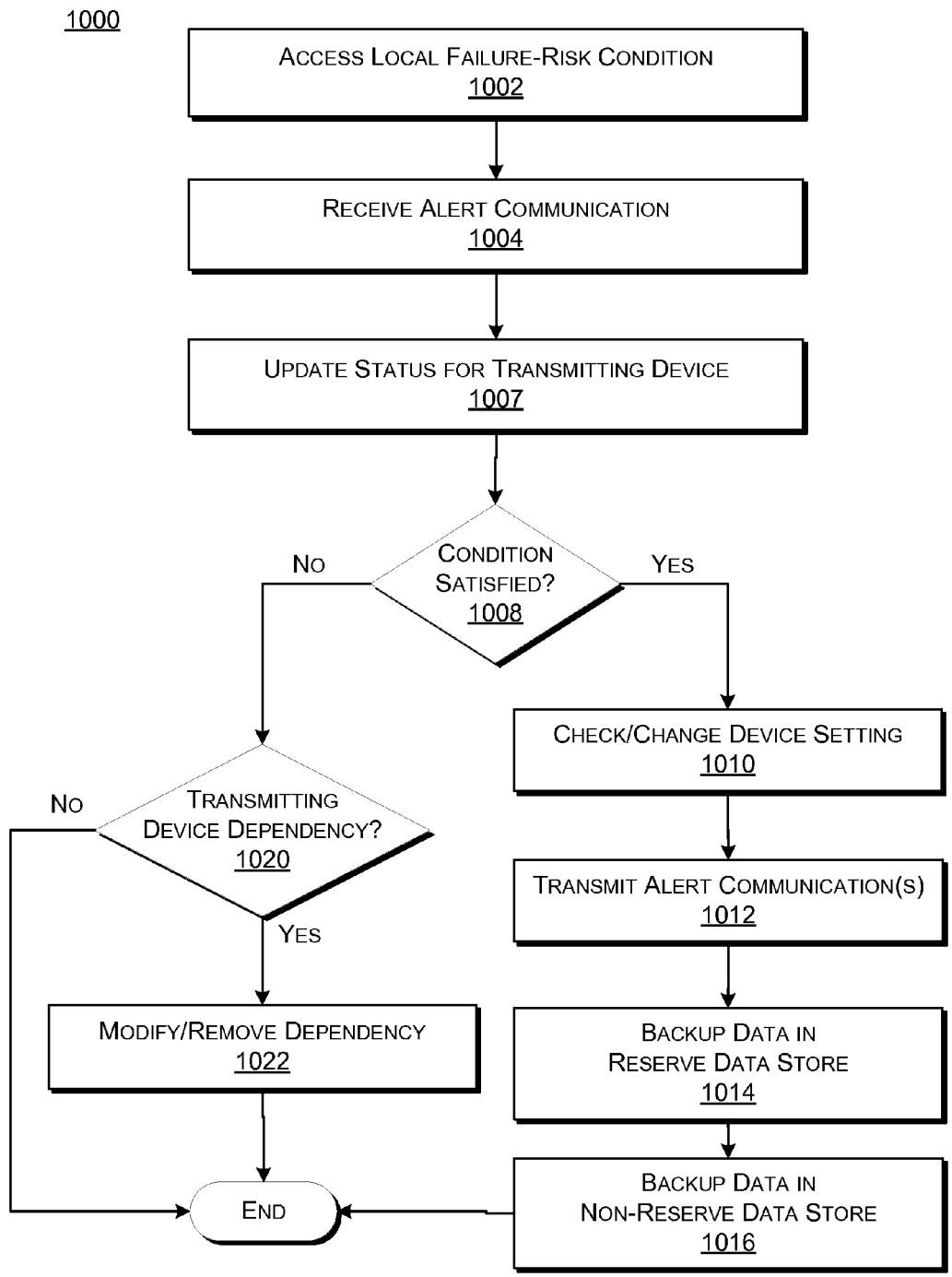
FIG. 10 illustrates an example of a process for triggering failure-risk actions according to an embodiment of the invention.

FIG. 10 illustrates an example of a process 1000 for triggering failure-risk actions according to an embodiment of the invention. Process 1000 can be performed in part or in its entirety at a network device.

Process 1000 begins at block 1002 where the condition evaluator 725 access a failure-risk condition from the failure-risk condition data store 730. The accessed condition can be one that indicates how to respond to an alert communication received from another device. Thus, in some instances, different failure-risk conditions pertain to situations where one or more alert communications have been received and to situations where no alert communications have been received (or a single condition may include multiple alternative criteria).

In one instance, the mere receipt of any alert communication is sufficient to satisfy the condition. In one instance, whether the condition is satisfied also depends on one or more other factors, such as: which device sent the communication (or a characteristic of the sending device, such as its device type or location), a sensor reading, a number of alert communications received (e.g., within a defined time period), a performance metric for the receiving device or component thereof, whether an operation rule for the device performing process 1000 includes a dependency on the device transmitting the communication and/or content of the alert communication (e.g., indicating a type of alert communication, a sensor reading, a performance metric or an instruction).

At block 1004, an alert communication is received by the transceiver 750. The communication can be received from another network device (e.g., on a same network that the receiving device is on). The alert communication may be received directly from the network device (e.g., via a short-range communication channel) or indirectly (e.g., via a gateway device, cloud server, access device and/or another network device).

At block 1007, the operation engine 710 updates a status for the transmitting device. Block 1007 can include updating the status corresponding to an identifier of the transmitting device in a local cache. The status may be changed to, for example, an alarm, questionable, off or non-responsive status. In some instances, changing the status may have an effect of preventing the receiving device from attempting to communication with the transmitting device until the status is again changed.

At decision block 1008, the condition evaluator 725 determines whether the failure-risk condition is satisfied. In some instances, receipt of the alert condition is sufficient. to satisfy the condition. In some instances, block 1008 includes an additional assessment, such as identifying a local sensor reading and/or device performance metric, extracting and analyzing information (e.g., identifying a transmitting device, sensor reading or performance metric, instruction, transmitting device characteristic, etc.) from the communication, determining whether (e.g., and/or how many) one or more other alert communications have been received, etc. Block 1008 may additionally include identifying which condition is satisfied, whereby different conditions may correspond to different responsive actions.

When the condition is determined to be satisfied, process 1000 continues to block 1010. Blocks 1010-1016 can parallel blocks 910-916 of process 900. It will be appreciated that, in various embodiments, a subset of blocks 1010-1016 may be performed, additional actions may be performed, and/or some or all of blocks 1010-1016 may be performed in a different order.

Receiving an alert communication may provide the receiving device with advanced notice of a potential problem. Thus, the receiving device may have more resources available to respond to the potential or actual failure than the transmitting device. This may allow the receiving device to, for example, backup data in a different type of data store (e.g., associated with a slower write speed), backup data by transmitting the data (e.g., to a cloud server), perform part or all of one or more of blocks 1010-1016 without relying on a reserve power supply, and/or transmit one or more alert communications via a higher-energy transport protocol.

When the condition is not determined to be satisfied, process 1000 continues to block 1020 where the operation engine 710 determines whether a rule pertaining to operation of the receiving device involves the transmitting device. For example, it can be determined whether a rule for the receiving device includes an indication that the device is to send a communication (e.g., upon a status change, at routine times, etc.) to the device having sent the alert communication. As another example, it can be determined whether a status of the device having received the alert communication is dependent on a status (or command instruction) from the device having transmitted the alert communication. For example, a switch may control whether power is to be supplied by an electrical outlet adapter. A rule for each of the switch and the adapter may then include a dependency on the other device (e.g., the switch needing to transmit status changes to the adapter, and the adapter needing to listen for status changes and adjust its status appropriately).

When a dependency is detected, process can continue to block 1022, where the operation engine 710 can modify or remove the dependency. For example, the dependency may be modified to refer to a different device as opposed to the one having transmitted the alert communication.

In some instances, blocks 1020-1022 can also be performed when the failure-risk condition is satisfied. In some instances, blocks 1020-1022 are only performed when the failure-risk condition is satisfied. Upon completion of process 1000, the performing device may monitor for an additional communication from the device having sent the alert communication, which may result in the performing device (for example) re-updating the status and/or again modifying or adding the dependency.

Figure 11:
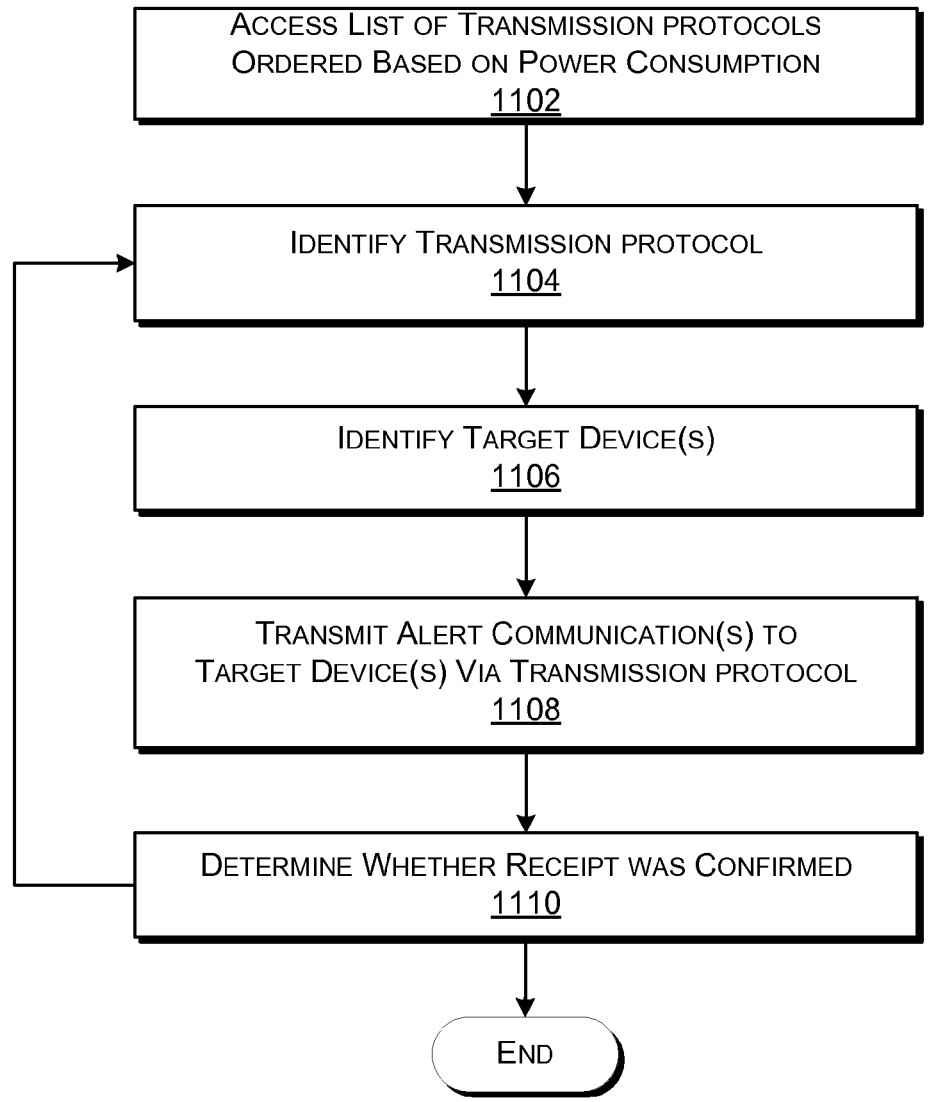
FIG. 11 illustrates an example of a process for transmitting an alert communication according to an embodiment of the invention.

FIG. 11 illustrates an example of a process 1100 for transmitting an alert communication according to an embodiment of the invention. One, more or all of blocks 812, 912 and 1012 may include some or all of process 1100.

Process 1102 begins at block 1102, where the alert engine 745 accesses a list of transmission protocols. A transmission protocol can include an indication as to what types of signals are being sent and/or what type of communication channel is being used. For example, a transmission protocol may indicate that a signal to be transmitted is to be a Zigbee™ signal, Bluetooth™ signal, WiFi™ signal, infrared (IR) signal, UWB signal, WiFi-Direct signal, BLE signal, sound frequency signal, or the like. The list can include, for example, a ranking or characteristic for each transmission protocol as pertaining to, for example, power or energy usage, range, reliability, security, speed and/or device compatibility.

At block 1104, the alert engine 745 identifies a transmission protocol from the list. The identified transmission protocol may include one with a low power consumption, large range, high reliability, high security, high speed and/or high device compatibility (e.g., such that it is compatible with the device performing process 1100, one or more devices on a network, one or more nearby devices, etc.). Identifying the transmission protocol may include, in some instances, generating a reduced list by eliminating one or more transmission protocols from consideration (e.g., eliminating those not compatible with the device performing process 1100). Identifying the transmission protocol can include identifying a transmission protocol from an original or reduced list with an extreme ranking or characteristic (e.g., a lowest energy usage). In some instances, a score is generated for each transmission protocol by weighting and summing each characteristic, and the transmission protocol identified can be one on the original or reduced list with a highest score.

At block 1106, the alert engine 745 identifies one or more target devices to which an alert communication is to be sent. Identifying the target device(s) can include, for example, identifying which devices are on a network, are within a particular room, are within a prescribed distance, which devices have the compatibility for the transmission protocol, are included in a dependency relating to the device performing process 1100, are of a particular type (e.g., a security-related device), are associated with a high priority, and/or are susceptible to damage. In some instances, all devices meeting one or more criteria are identified as being target devices. In some instances, a defined number of devices (e.g., a single device) is identified.

At block 1108, the transceiver 750 (e.g., wirelessly) transmits one or more alert communications to the target device(s) using the identified transmission protocols. When multiple target devices are identified, a same, single alert communication may be transmitted to all devices or different communications may be sent (e.g., including different instructions). Block 1108 may include broadcasting an alert communication (e.g., in which case block 1106 may be omitted).

At block 1110, the alert engine 745 determines whether the target device(s) confirmed receipt. In some instances, if receipt was not confirmed, transmission to the target device(s) is reattempted using another transmission protocol. For example, the used transmission protocol may be eliminated from consideration and another transmission protocol can be identified as described above.

Process 1100 can also return to block 1104 so as to transmit an alert communication to different target devices. The different target devices can include those, for example, of a different transmission-protocol compatibility, location, dependency, priority, type, etc.

The repetition of process 1100 can, in some instances, allow a device to initially transmit one or more alert protocols using a low-energy transmission protocol, which may conserve a finite power source. Meanwhile, due to the iterative nature, process 1100 can nonetheless provide a high likelihood that important communications are successfully transmitted, even if the low-energy transmission protocol is not sufficient. In some instances, the repetition of blocks 1104-1110 continues until alert communications have been sent to all of a set of devices (e.g., all devices on a network) or until a performing device runs out of power.

Figure 12:
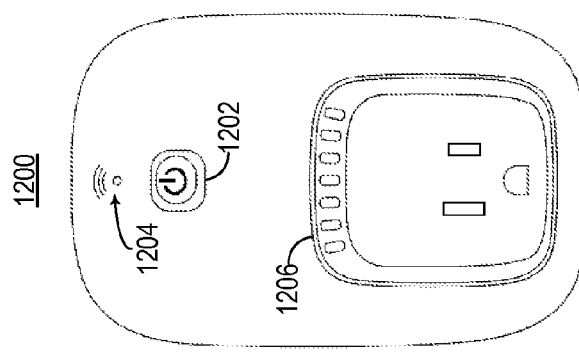
FIG. 12 is an illustration of an example of a front view of a network device, in accordance with an embodiment.
Figure 13:
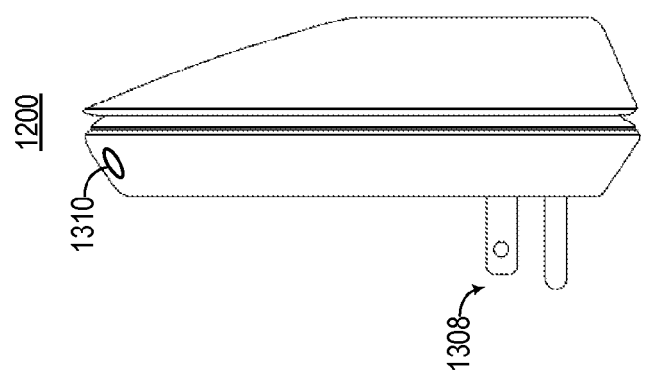
FIG. 13 is an illustration of an example of a side view of a network device, in accordance with an embodiment.

FIG. 12 illustrates an example of a front view of a network device 1200. FIG. 13 illustrates an example of a side view of the network device 1200. The network device 1200 may include any of the network devices 102, 104, or 106 described herein. In some embodiments, the network device 1200 may be a home automation network device. For example, the network device 1200 may include a home automation switch that may be coupled with a home appliance. A user may wirelessly access the network device 1200 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1200 may include a WiFi enabled switch that connects home appliances and other electronic devices to a compatible 802.11b/g/n/ac WiFi network. The network device 1200 may thus allow users to locally or remotely turn devices on or off from anywhere, program customized notifications, and/or change device status. The network device 1200 may further allow a user to create custom schedules or have devices respond to sunrise or sunset.

The network device 1200 includes an power switch 1202 that may be depressed in order to turn the network device 1200 on and off. In some embodiments, a light source may be integrated with or located behind the power switch. For example, a light-emitting diode (LED) may be located on a circuit board under the power button 1202. The light source may be illuminated when the network device 1200 is powered on, and may not be illuminated when the network device 1200 is powered off.

The network device 1200 further includes a communications signal indicator 1204. The signal indicator 1204 may indicate whether the network device 1200 has access to a communications signal, such as a WiFi signal. For example, the signal indicator 1204 may include a light source (e.g., a LED) that illuminates when the network device 1200 is connected to a communications signal. The light source may depict different colors or other characteristics (e.g., flashing, dimming, or the like) to indicate different levels of signal strength or mode of operation.

The network device 1200 includes a restore button 1310. The restore button 1310 may allow a user to reset the network device 1200 to factory default settings. For example, upon being depressed, the restore button 1310 may cause all software on the device to be reset to the settings that the network device 1200 included when purchased from the manufacturer.

The network device 1200 further includes a plug 1308 and an outlet 1206. The plug 1308 allows the network device 1200 to be plugged into a wall socket, such as a socket providing 120V, 220V, or the like. In turn, an appliance may be plugged into the outlet 1206. Once the network device 1200 is registered according to the techniques described above, an appliance plugged into the socket 1206 may be controlled by a user using an access device (e.g., access device 108).

Figure 14:
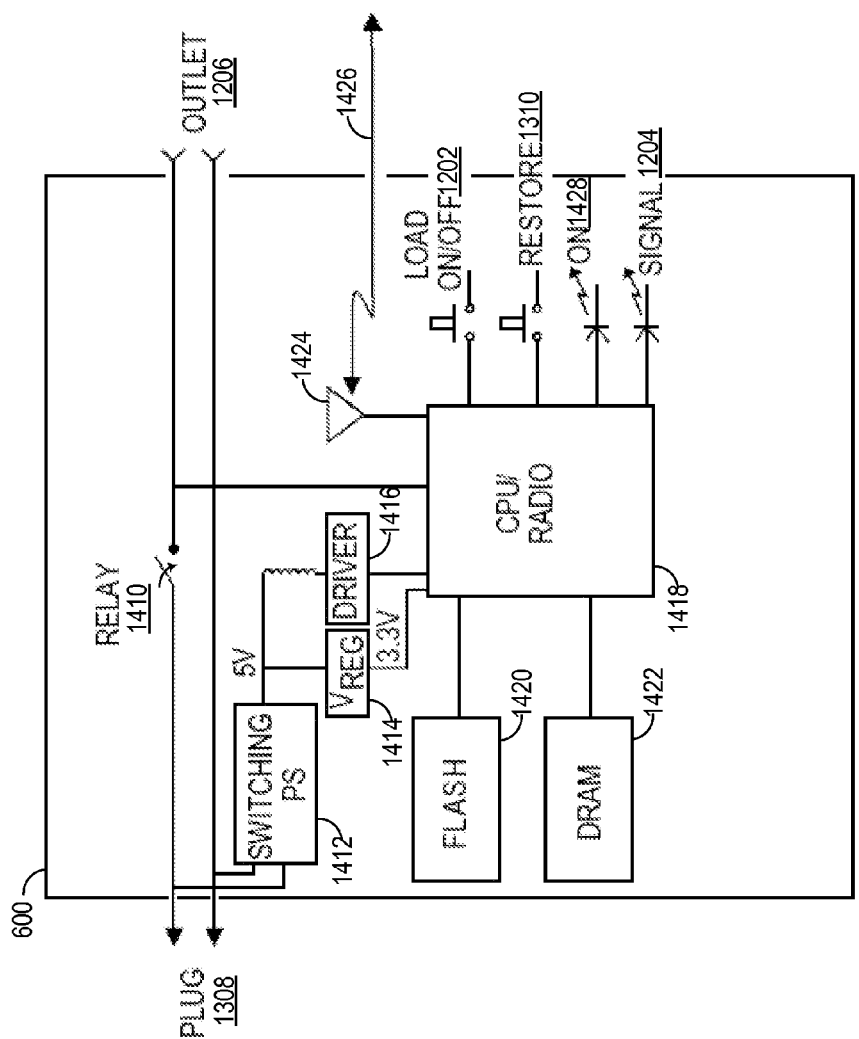
FIG. 14 is an example of a block diagram of a network device, in accordance with an embodiment.

FIG. 14 is an example of a block diagram of the network device 1200 depicting different hardware and/or software components of the network device 1200. As described above with respect to FIGS. 12 and 13, the network device 1200 includes the outlet 1206, the plug 1308, the power button 1202, the restore button 1310, and the communications signal indicator 1204. The network device 1200 also includes light source 1428 associated with the power button 1202. As previously described, the light source 1428 may be illuminated when the network device 1200 is powered on.

The network device 1200 further includes a relay 1410. The relay 1410 is a switch that controls whether power is relayed from the plug 1308 to the outlet 1206. The relay 1410 may be controlled either manually using the power button 1202 or remotely using wireless communication signals. For example, when the power button 1202 is in an ON position, the relay 1410 may be closed so that power is relayed from the plug 1308 to the outlet 1206. When the power button 1202 is in an OFF position, the relay 1410 may be opened so that current is unable to flow from the plug 1308 to the outlet 1206. As another example, an application or program running on an access device may transmit a signal that causes the relay 1410 to be opened or closed. For instance, an access application may display a graphical interface on the access device that includes a power button. The user may tap or otherwise select the power button, and the access application may send a communication signal (e.g., over a WiFi network) to the network device 1200 instructing the network device 1200 to open or close the relay 1410.

The network device 1200 further includes flash memory 1420 and dynamic random access memory (DRAM) 1422. The flash memory 1420 may be used to store instructions or code relating to an operating system, one or more applications, and any firmware. The flash memory 1420 may include nonvolatile memory so that any firmware or other program can be can updated. In the event the network device 1200 loses power, information stored in the flash memory 1420 may be retained. The DRAM 1422 may store various other types of information needed to run the network device 1200, such as all runtime instructions or code.

The network device 1200 further includes a CPU/Radio 1418. The CPU/Radio 1418 controls the operations of the network device 1200. For example, the CPU/Radio 1418 may execute various applications or programs stored in the flash memory 1420 and/or the dynamic random access memory (DRAM) 1422. The CPU/Radio 1418 may also receive input from the various hardware and software components, interpret the input, and perform one or more functions in response to the input. As one example, the CPU/Radio 1418 may determine whether the power button 1202 has been pressed, and determines whether the relay 1410 needs to be opened or closed. The CPU/Radio 1418 may further perform all communications functions in order to allow the network device 1200 to communicate with other network devices, one or more gateways, a cloud network, and/or one or more access devices. While the CPU and radio of the network device 1200 are shown to be combined in the CPU/Radio 1418, one of ordinary skill in the art will appreciate that, in some embodiments, the CPU and radio may be separately located within the network device 1200. For example, CPU circuitry may be situated at a separate location on a circuit board from the location of radio circuitry, the CPU circuitry may be located on a different circuit board from the radio circuitry, or the like. Further, the network device 1200 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 1200 does not include a cellular network transceiver radio or interface, and thus may not be configured to directly communicate with a cellular network. In some embodiments, the network device 1200 may include a cellular network transceiver radio, and may be configured to communicate with a cellular network using the cellular network transceiver radio.

The network device 1200 may communicate with other devices and/or networks via antenna 1424. For example, antenna 1424 may include a 2.4 GHz antenna, a 5 GHz antenna, or the like, that can transmit and receive WiFi communications signals. The network device 1200 may include other types of antennas that can communicate Bluetooth® signals, Zigbee® signals, Ultra-Wideband (UWB) signals, WiFi-Direct signals, BLE signals, and/or the like. In some embodiments, the antenna 1424 may be configured to communicate different types of signals, such as the WiFi signals, Bluetooth® signals, Zigbee® signals, UWB signals, WiFi-Direct signals, BLE signals, and/or the like. In some embodiments, the network device 1200 may include multiple antennas for communicating the different types of communication signals. As one example, the network device 1200 may include both a 2.4 GHz antenna and a 5 GHz antenna.

The network device 1200 further includes a driver 1416, a switching power supply 1412, and a voltage regulator 1414. The driver 1416 may include instructions or code that can be used to translate control signals or commands received from applications running on the DRAM 1422 to commands that the various hardware components in the network device 1200 can understand. In some embodiments, the driver 1416 may include an ambient application running on the DRAM 1422. The switching power supply 1412 may be used to transfer power from the outlet in which the plug 1308 is connected to the various loads of the network device 1200 (e.g., CPU/Radio 1418). The switching power supply 1412 may efficiently convert the voltage and current characteristics of the electrical power to a level that is appropriate for the components of the network device 1200. For example, the switching power supply 1412 may perform AC-DC conversion. In some embodiments, the switching power supply 1412 may be used to control the power that is relayed from the plug 1308 to the outlet 1206. The voltage regulator 1414 may be used to convert the voltage output from the switching power supply 1412 to a lower voltage usable by the CPU/Radio 1418. For example, the voltage regulator 1414 may regulate the DC voltage from 5V to 3.3V.

In various embodiments, functions may be stored as one or more computer-program products, such as instructions or code, in a non-transitory machine-readable storage medium, such as the flash memory 1420 and/or the DRAM 1422. The network device 1200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 1420 and/or the DRAM 1422, may be a processor-readable memory and/or a computer-readable memory that stores software code (programming code, instructions, etc.) configured to cause a processor(s) within the CPU/Radio 1418 to perform the functions described. In other embodiments, one or more of the functions described may be performed in hardware.

A set of these instructions and/or code might be stored on a non-transitory machine-readable storage medium, such as the flash memory 1420 and/or the DRAM 1422. In some cases, the storage medium might be incorporated within a computer system, such as the CPU/Radio 1418. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1200 and/or might take the form of source and/or installable code, which, upon compilation and/or installation on the network device 1200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1200 may have other components than those depicted in FIGS. 12-14. Further, the embodiment shown in the figures are only one example of a network device that may incorporate an embodiment of the invention. In some other embodiments, network device 1200 may have more or fewer components than shown in the figure, may combine two or more components, or may have a different configuration or arrangement of components.

Figure 15:
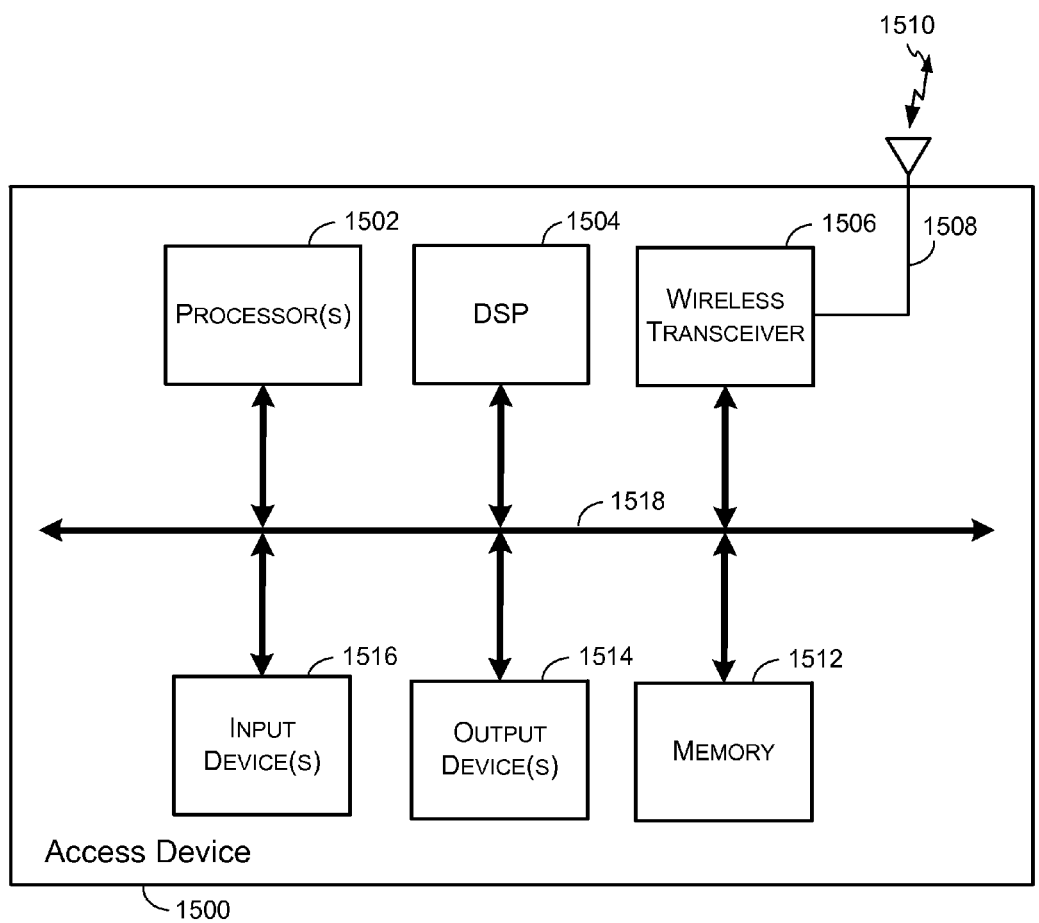
FIG. 15 is a block diagram illustrating an example of an access device, in accordance with some embodiments.

FIG. 15 illustrates an example of an access device 1500. The access device 1500 may include any human-to-machine interface with network connection capability that allows access to a network. For example, the access device 1500 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1500 includes hardware elements that can be electrically coupled via a bus 1518 (or may otherwise be in communication, as appropriate). In one embodiment, the bus 1518 can be used for the processor(s) 1502 to communicate between cores and/or with the memory 1512. The hardware elements may include one or more processors 1502, including without limitation one or more general-purpose processors and/or one or more special-purpose processors (such as digital signal processing chips, graphics acceleration processors, and/or the like); one or more input devices 1516, which can include without limitation a camera, a mouse, a keyboard, a touch sensitive screen, a touch pad, a keypad, and/or the like; and one or more output devices 1514, which can include, without limitation, a display, a printer, and/or the like.

The access device 1500 may include one or more wireless transceivers 1506 connected to the bus 1518. The wireless transceiver 1506 may be operable to receive wireless signals (e.g., signal 1510) via antenna 1508. The wireless signal 1510 may be transmitted via a wireless network. In some embodiments, the wireless network may be any wireless network including but not limited to a wireless local area network (e.g., local area network 100), such as WiFi, a Personal Access Network (PAN), such as Bluetooth®, Zigbee®, or UWB, or a wide area network, such as a cellular network (e.g. a GSM, WCDMA, LTE, CDMA2000 network), a cloud network, the Internet, or other network. Wireless transceiver 1506 may be configured to receive various radio frequency (RF) signals (e.g., signal 1510) via antenna 1508 from one or more gateways, network devices, other access devices, cloud networks, and/or the like. Access device 1500 may also be configured to decode and/or decrypt, via the DSP 1504 and/or processor(s) 1502, various signals received from one or more gateways, network devices, other access devices, cloud networks, and/or the like.

The access device 1500 may further include (and/or be in communication with) one or more non-transitory machine-readable storage mediums or storage devices (e.g., memory 1512), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1512, such as RAM, ROM, FLASH, or disc drive, and executed by processor(s) 1502 or DSP 1504. The access device 1500 can also comprise software elements (e.g., located within the memory 1512), including, for example, an operating system, device drivers, executable libraries, and/or other code, such as one or more application programs, which may comprise computer programs implementing various functions. Memory 1512 may be a non-transitory machine-readable storage medium, processor-readable memory, and/or a computer-readable memory that stores the one or more computer-program products configured to cause the processor(s) 1502 and/or DSP 1504 to perform the various functions. In other embodiments, the various functions described may be performed in hardware.

Figure 16:
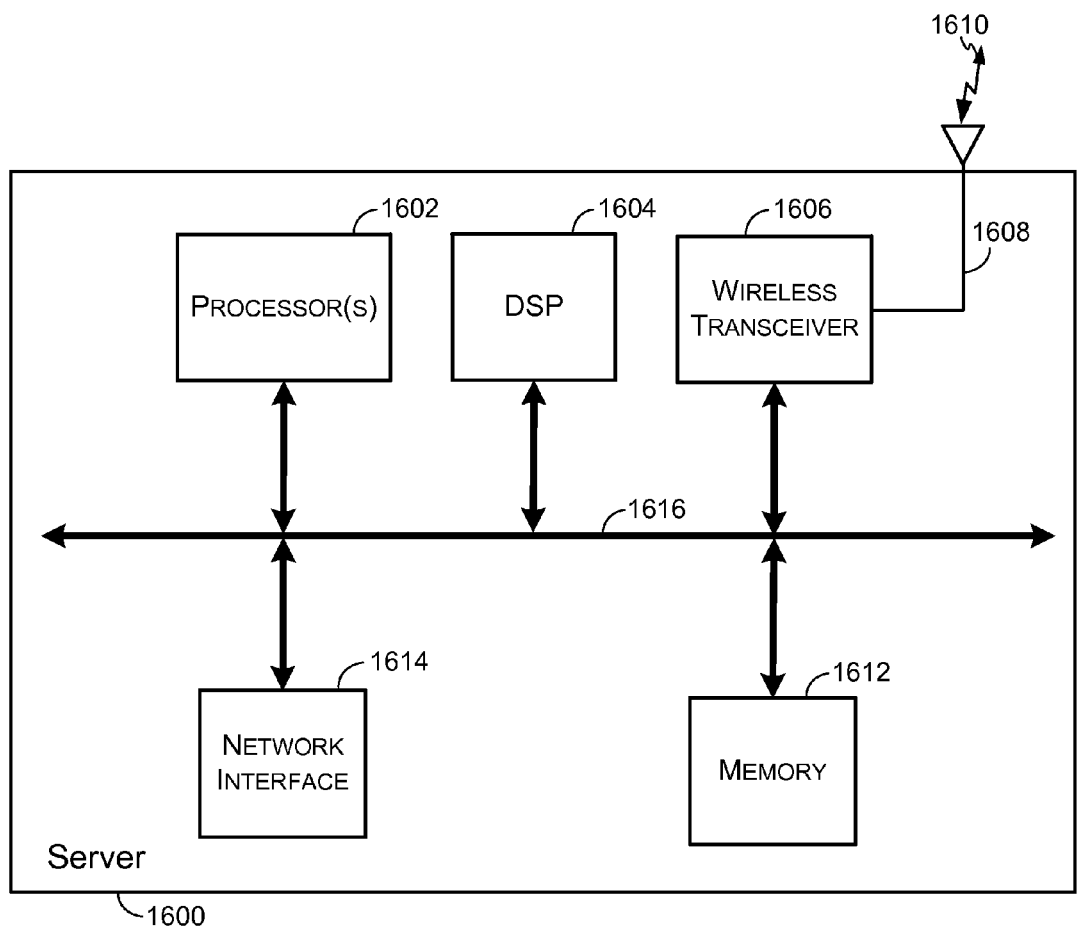
FIG. 16 is a block diagram illustrating an example of a server, in accordance with some embodiments.

FIG. 16 illustrates an example of a server 1600. The server 1600 includes hardware elements that can be electrically coupled via a bus 1616 (or may otherwise be in communication, as appropriate). In one embodiment, the bus 1616 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like), memory 1612, DSP 1604, a wireless transceiver 1606, a bus 1616, and antenna 1608. Furthermore, in addition to the wireless transceiver 1606, server 1600 can further include a network interface 1614 to communicate with a network (e.g., a local area network, a network of a preferred carrier, Internet, etc.).

The server 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1612. The server 1600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 1612 may be a non-transitory machine-readable storage medium, processor-readable memory, and/or a computer-readable memory that stores the one or more computer-program products configured to cause the processor(s) 1602 to perform the functions described. In other embodiments, one or more of the functions described may be performed in hardware.

A set of these instructions and/or code might be stored on a non-transitory machine-readable storage medium, such as the memory 1612. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1600 and/or might take the form of source and/or installable code, which, upon compilation and/or installation on the server 1600 (e.g., using any of a variety of generally available compilers, installation programs, compression/decompression utilities, etc.) then takes the form of executable code.

Figure 17:
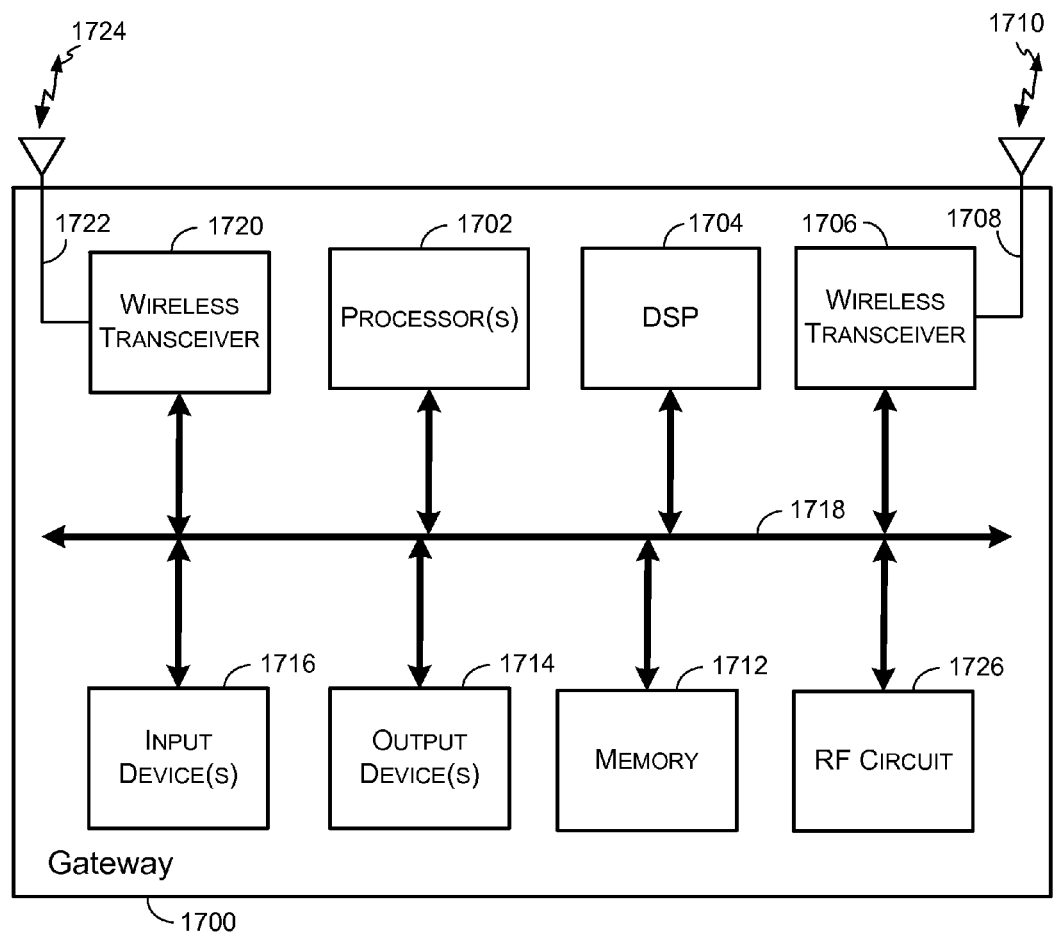
FIG. 17 is a block diagram illustrating an example of a gateway, in accordance with some embodiments.

FIG. 17 illustrates an example of a gateway 1700. The gateway 1700 may include a range extending device, a router, an access point, a modem, and/or any other device that provides network access among one or more computing devices and/or external networks. For example, the gateway 1700 may include a router gateway with access point and router functionality, and may further include an Ethernet switch and/or a modem. As another example, the gateway 1700 may include a range extending gateway that may be used to improve signal range and strength within a network by taking an existing signal from another gateway (e.g., a router gateway, an access point, or the like) and rebroadcasting the signal to create a second logical network.

The gateway 1700 includes hardware elements that can be electrically coupled via a bus 1718 (or may otherwise be in communication, as appropriate). In one embodiment, the bus 1718 can be used for the processor(s) 1702 to communicate between cores and/or with the memory 1712. The hardware elements may include one or more processors 1702, including without limitation one or more general-purpose processors and/or one or more special-purpose processors (such as digital signal processing chips, graphics acceleration processors, and/or the like); one or more input devices 1716, which can include without limitation one or more buttons, a keyboard, a keypad, a touch sensitive screen, a touch pad, and/or the like; and one or more output devices 1714, which can include, without limitation, a display, light or sound indicators, and/or the like.

The gateway 1700 may include one or more wireless transceivers 1706 and 1720 connected to the bus 1718. The wireless transceiver 1706 may be operable to receive wireless signals (e.g., a wireless signal 1710) via an antenna 1708. The wireless transceivers 1720 may be operable to receive wireless signals (e.g., a wireless signal 1714) via an antenna 1722. The wireless transceivers 1706 and 1720 may each include a WiFi transceiver radio designed to transmit and receive signals using frequencies of a specific frequency band, which may be referred to herein as "WiFi circuits." For example, wireless transceiver 1706 may include a 2.4 GHz WiFi circuit, and wireless transceiver 1720 may include a 5 GHz WiFi circuit. Accordingly, the gateway 1700 may include a single WiFi circuit for a first WiFi frequency band, and a single WiFi circuit for a second WiFi frequency band. In some embodiments, the gateway 1700 may include multiple wireless transceivers (not shown) for each available frequency band. The antennas 1708 and 1722 may include multiple band antennas that can transmit and/or receive signals over different frequency bands.

The gateway 1700 may further include radio frequency (RF) circuit 1726. In some embodiments, the wireless transceivers 1706 and 1720 may be integrated with or coupled to the RF circuit 1726 so that the RF circuit 1726 includes the wireless transceivers 1706 and 1720. In some embodiments, the wireless transceivers 1706 and 1720 and the RF circuit 1726 are separate components. The RF circuit 1726 may include a RF amplifier that may amplify signals received over antennas 1708 and 1722. The RF circuit 1726 may also include a power controller that may be used to adjust signal amplification by the RF amplifier. The power controller may be implemented using hardware, firmware, software, or any combination thereof.

The wireless signals 1710 and 1724 may be transmitted via a wireless network. In some embodiments, the wireless network may be any wireless network including but not limited to a wireless local area network (e.g., local area network 100), such as WiFi™, a Personal Access Network (PAN), such as Bluetooth®, Zigbee®, or UWB, or a wide area network, such as a cellular network (e.g. a GSM, WCDMA, LTE, CDMA2000 network), a cloud network, the Internet, or other network. Wireless transceivers 1706 and 1720 may be configured to receive various radio frequency (RF) signals (e.g., signals 1710 and 1724) via antennas 1708 and 1724, respectively, from one or more other gateways, access devices, network devices, cloud networks, and/or the like. Gateway 1700 may also be configured to decode and/or decrypt, via the DSP 1704 and/or processor(s) 1702, various signals received from one or more gateways, network devices, cloud networks, and/or the like.

The gateway 1700 may include a power supply (not shown) that can power the various components of the gateway 1700. The power supply may include a switch-mode power supply, a linear power supply, a push-pull power supply, or any other suitable type of power supply. In some embodiments, the gateway 1700 may include multiple power supplies. For example, a switch-mode power supply may be used to condition input power, and a linear power supply may be used to power the RF circuit 1726. The power supply may be configured to operate over various ranges of appropriate input voltages.

The gateway 1700 may further include (and/or be in communication with) one or more non-transitory machine-readable storage mediums or storage devices (e.g., memory 1712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1712, such as RAM, ROM, FLASH, or disc drive, and executed by processor(s) 1702 or DSP 1704. The gateway 1700 can also comprise software elements (e.g., located within the memory 1712), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to one or more of FIGS. 2 and 8-11, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2 and 8-11. The memory 1712 may be a non-transitory machine-readable storage medium, processor-readable memory, and/or a computer-readable memory that stores the one or more computer-program products configured to cause the processor(s) 1702 to perform the functions described. In other embodiments, one or more of the functions described may be performed in hardware.

A set of these instructions and/or code might be stored on a non-transitory machine-readable storage medium, such as the memory 1712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1700 and/or might take the form of source and/or installable code, which, upon compilation and/or installation on the gateway 1700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A device comprising:
a non-volatile reserve memory;
a detector configured to characterize a physical stimulus or an operation of a component of the device;
one or more data processors; and
a non-transitory computer readable storage medium containing instructions which, when executed on the one or more data processors, cause the one or more data processors to perform actions including:
determining that a failure-risk condition is satisfied, wherein the determination is made based on the characterization of the physical stimulus or operation of the component of the device;
identifying a current setting of the device, wherein the current setting includes one identified based on application of a learning technique; and
in response to determining that the failure-risk condition is satisfied, backing up data that includes the current setting in the non-volatile reserved memory.

2. The device as recited in claim 1, wherein the actions further include using a reserve power source of the device to perform the backing up data in the non-volatile reserved memory.

3. The device as recited in claim 1, wherein data is backed up onto the non-volatile reserved memory only when it is determined that the failure-risk condition is satisfied.

4. The device as recited in claim 1, wherein determining that the failure-risk condition is satisfied includes determining that a power spike occurred or that power from a local or remote power supply has been lost.

5. The device as recited in claim 1, wherein determining that the failure-risk condition is satisfied includes determining that the component of the device is malfunctioning, non-responsive or non-operational.

6. The device as recited in claim 1, wherein the non-volatile reserve memory includes a flash memory.

7. The device as recited in claim 1, wherein the determination that the failure-risk condition is satisfied is made based on the characterization of the physical stimulus, wherein the characterization of the physical stimulus includes a sensor reading, and wherein backing up the data includes storing the sensor reading on the non-volatile reserved memory.

8. The device as recited in claim 1, wherein the actions further include:
identifying one or more other current settings of the device, wherein each of the one or more other current settings is one defined based on user input, wherein the data includes the one or more other current settings.

9. The device as recited in claim 1, further comprising:
in response to determining that the failure-risk condition is satisfied, facilitating transmission of an alert communication to another device, wherein the device and the other device are part of a same local area network, and wherein the alert communication corresponds to an indication that the failure-risk condition is satisfied.

10. The device as recited in claim 1, further comprising:
in response to determining that the failure-risk condition is satisfied, facilitating transmission of an alert communication to a mobile access device, wherein the device and the mobile access device are associated with a same local area network, and wherein the alert communication corresponds to an indication that the failure-risk condition is satisfied.

11. A computer-implemented method comprising:
characterizing a stimulus sensed at a device or an operation of a component of the device;
determining that a failure-risk condition is satisfied, wherein the determination is made based on the characterization of the stimulus or the operation of the component of the device;
identifying a current setting of the device, wherein the current setting includes one identified based on application of a learning technique; and
backing up, at the device, data that includes the current setting in a non-volatile reserve memory in response to the determining that the failure-risk condition is satisfied, wherein the device includes the non-volatile reserve memory.

12. The method as recited in claim 11, further comprising using a reserve power source of the device to perform the backing up data in the non-volatile reserved memory.

13. The method as recited in claim 11, wherein data is backed up onto the non-volatile reserved memory only when it is determined that the failure-risk condition is satisfied.

14. The method as recited in claim 11, wherein determining that the failure-risk condition is satisfied includes determining that a power spike occurred or that power from a local or remote power supply has been lost.

15. The method as recited in claim 11, wherein determining that the failure-risk condition is satisfied includes determining that the component of the device is malfunctioning, non-responsive or non-operational.

16. The method as recited in claim 11, wherein the non-volatile reserve memory includes a flash memory.

17. The method as recited in claim 11, wherein the determination that the failure-risk condition is satisfied is made based on the characterization of the physical stimulus, wherein the characterization of the physical stimulus includes a sensor reading, and wherein backing up the data includes storing the sensor reading on the non-volatile reserved memory.

18. The method as recited in claim 11, further comprising:
identifying one or more other current settings of the device, wherein each of the one or more other current settings is one defined based on user input, wherein the data includes the one or more other current settings.

19. The method as recited in claim 11, wherein the actions further include:
in response to determining that the failure-risk condition is satisfied, facilitating transmission of an alert communication to another device, wherein the device and the other device are part of a same local area network, and wherein the alert communication corresponds to an indication that the failure-risk condition is satisfied.

20. A computer-program product tangibly embodied in a non-transitory machine-readable storage medium, including instructions configured to cause one or more data processors to perform actions including:
characterizing a stimulus sensed at a device or an operation of a component of the device;
determining that a failure-risk condition is satisfied, wherein the determination is made based on the characterization of the stimulus or the operation of the component of the device; and
identifying a current setting of the device, wherein the current setting includes one identified based on application of a learning technique; and
backing up, at the device, data that includes the current setting in a non-volatile reserve memory in response to the determining that the failure-risk condition is satisfied, wherein the device includes the non-volatile reserve memory.

21. The computer-program product as recited in claim 20, wherein the actions further include facilitating use of a reserve power source of the device to perform the backing up data in the non-volatile reserved memory.

22. The computer-program product device as recited in claim 20, wherein the actions further include:
   identifying one or more other current settings of the device, wherein each of the one or more other current settings is one defined based on user input, wherein the data includes the one or more other current settings.

* * * * *